(12) United States Patent
Lee et al.

(10) Patent No.: US 12,230,845 B2
(45) Date of Patent: Feb. 18, 2025

(54) ECO-FRIENDLY POWER SOURCE SUCH AS BATTERY MODULE FOR TRANSPORTATION VEHICLE

(71) Applicant: SK On Co., Ltd., Seoul (KR)

(72) Inventors: Eung Ho Lee, Daejeon (KR); Chae Won Na, Daejeon (KR); Yun Joo Noh, Daejeon (KR); Doo Yeong Lee, Daejeon (KR); Tae Hyun Chun, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

(21) Appl. No.: 18/328,249

(22) Filed: Jun. 2, 2023

(65) Prior Publication Data

US 2023/0395955 A1 Dec. 7, 2023

(30) Foreign Application Priority Data

Jun. 7, 2022 (KR) ........................ 10-2022-0069029

(51) Int. Cl.
| | |
|---|---|
| *H01M 50/588* | (2021.01) |
| *B60L 50/64* | (2019.01) |
| *H01M 10/658* | (2014.01) |
| *H01M 50/211* | (2021.01) |
| *H01M 50/271* | (2021.01) |

(Continued)

(52) U.S. Cl.
CPC ........... *H01M 50/588* (2021.01); *B60L 50/64* (2019.02); *H01M 10/658* (2015.04); *H01M 50/211* (2021.01); *H01M 50/271* (2021.01); *H01M 50/289* (2021.01); *H01M 50/507* (2021.01); *H01M 2220/20* (2013.01)

(58) Field of Classification Search
CPC ......................... H01M 50/505; H01M 50/507
See application file for complete search history.

(56) References Cited

U.S. PATENT DOCUMENTS

2010/0112424 A1* 5/2010 Hayashi .............. H01M 16/006
429/99
2010/0266883 A1* 10/2010 Koetting ........... H01M 10/6551
429/96

(Continued)

FOREIGN PATENT DOCUMENTS

| KR | 10-2020-0107213 A | 9/2020 | |
| WO | WO-2016182610 A1 * | 11/2016 | ........ H01M 10/0525 |
| WO | WO-2021262634 A1 * | 12/2021 | ........... B32B 27/283 |

OTHER PUBLICATIONS

Mica Data; https://clevelandmica.com/mica-data/ printed Oct. 27, 2023 from Cleveland Mica company (Year: 2023).*

(Continued)

*Primary Examiner* — Maria Laios
(74) *Attorney, Agent, or Firm* — IP & T GROUP LLP

(57) ABSTRACT

An eco-friendly power source, such as a battery module for a transportation vehicle, including a housing having an internal space; a cell stack accommodated in the internal space and including a plurality of battery cells; a busbar assembly including a busbar electrically connecting the plurality of battery cells to each other; and an insulation cover assembly preventing short circuit between the busbar and the housing, wherein the insulation cover assembly includes a cover frame disposed between the busbar and the housing; and a short-circuit prevention member coupled to the cover frame.

20 Claims, 10 Drawing Sheets

(51) Int. Cl.
    *H01M 50/289*     (2021.01)
    *H01M 50/507*     (2021.01)

(56) References Cited

U.S. PATENT DOCUMENTS

| | | | |
|---|---|---|---|
| 2013/0130087 A1* | 5/2013 | Kawaguchi | H01M 10/658 429/120 |
| 2021/0021008 A1 | 1/2021 | Mummigatti et al. | |
| 2021/0320374 A1 | 10/2021 | Lee et al. | |
| 2022/0231370 A1* | 7/2022 | Yang | E06B 5/16 |
| 2022/0367971 A1* | 11/2022 | Hong | H01M 50/507 |

OTHER PUBLICATIONS

Dr. Ekkehard Füglein and Dr. Stefan Schmölzer TGA Measurements on Mica Printed Oct. 27, 2023 (Year: 2023).*

* cited by examiner

ECO-FRIENDLY POWER SOURCE SUCH AS BATTERY MODULE FOR TRANSPORTATION VEHICLE

CROSS-REFERENCE TO RELATED APPLICATION(S)

This patent document claims the priority and benefits of Korean Patent Application No. 10-2022-0069029 filed on Jun. 7, 2022, the disclosure of which is incorporated herein by reference in its entirety.

TECHNICAL FIELD

The technology and implementations disclosed in this patent document generally relate to a battery module.

BACKGROUND

Unlike a primary battery, a secondary battery can charge and discharge electricity, and thus can be applied to devices within various fields such as a digital camera, a mobile phone, a laptop computer, a hybrid vehicle, and an electric vehicle. The secondary battery may include a nickel-cadmium battery, a nickel-metal hydride battery, a nickel-hydrogen battery, a lithium secondary battery, and the like. As a secondary battery in hybrid or electric vehicles, greenhouse gas emission can be mitigated.

The secondary battery may be manufactured as a flexible pouch-type battery cell, a rigid prismatic-type battery cell, or a cylindrical can-type battery cell, and may be used by electrically connecting a plurality of battery cells. In this case, the plurality of battery cells may form a cell stack, and may be disposed in a housing, to configure a battery device such as a battery module or a battery pack.

Meanwhile, when various adverse events occur, such as when a lifespan of a battery cell reaches an end thereof, when a swelling phenomenon occurs in a battery cell, when a battery cell is overcharged, when a battery cell is exposed to heat, when a sharp object such as a nail penetrates an exterior material of a battery cell, when an external shock is applied to a battery cell, and/or the like, the battery cell may be ignited. A flame or a high-temperature gas ejected from a battery cell may cause a chain ignition of other adjacent battery cells accommodated in a battery device, and may cause a thermal runaway condition.

In particular, as a flame, a high-temperature gas, and a conductive particle, ejected from a battery cell, flow in a battery module, there may be a risk of directly igniting other adjacent battery cells or causing a short circuit between components of the battery module. This may further aggravate the thermal runaway condition.

In particular, a high-temperature gas or a flame may collapse a structure for electrically separating a conductive busbar and a housing (case) from each other, and conductive particles may be stacked in the collapsed structure to form an electric circuit connecting the conductive busbar and the housing. There may be a risk of exploding a battery module when a thermal runaway condition of the battery module intensifies due to a short circuit between the conductive busbar and the housing.

SUMMARY

Various embodiments of the technology disclosed herein address at least some of the problems described above, and provide an eco-friendly power source, such as a battery module for a transportation vehicle which prevents or reduces the chance of an electrical short circuit from occurring between a busbar and a housing under a thermal runaway condition. The battery module(s) disclosed herein can be used as a secondary battery in hybrid or electric vehicles and/or in energy storage system (e.g., batteries charged from solar cells or wind power), whereby greenhouse gas emission can be reduced or mitigated.

In one embodiment of the disclosed technology, a battery module is provided with an insulation cover assembly having resistance to a high-temperature gas or a flame under a thermal runaway condition.

In another embodiment of the disclosed technology, a battery module is provided with a short-circuit prevention member preventing conductive particles from being stacked between a busbar and a housing under a thermal runaway condition.

In some embodiments of the disclosed technology, a battery module includes a housing having an internal space; a cell stack accommodated in the internal space and including a plurality of battery cells; a busbar assembly including a busbar electrically connecting the plurality of battery cells to each other; and an insulation cover assembly preventing short circuit between the busbar and the housing, wherein the insulation cover assembly includes: a cover frame disposed between the busbar and the housing; and a short-circuit prevention member coupled to the cover frame.

In various embodiments, the short-circuit prevention member may include a material having a higher melting point than the cover frame.

In various embodiments, the short-circuit prevention member may include ceramic wool.

In various embodiments, the short-circuit prevention member may include a material having a thermal conductivity of less than 1.0 W/mK, and, in thermogravimetric analysis (TGA), a residual amount of the material at 800° C. is 60 weight % or more.

In various embodiments, the short-circuit prevention member may include a material incombustible at a temperature of 800° C.

In various embodiments, the plurality of battery cells may be stacked in a first direction, and the busbar may oppose at least a portion of the cell stack in a second direction, perpendicular to the first direction.

In various embodiments, the short-circuit prevention member may be disposed between the busbar and the housing.

In various embodiments, one surface of the short-circuit prevention member may oppose the busbar, and the other surface of the short-circuit prevention member, opposite to the one surface, may oppose the cover frame.

In various embodiments, the short-circuit prevention member may be spaced apart from the busbar in the second direction.

In various embodiments, one surface of the short-circuit prevention member may oppose the cover frame, and the other surface of the short-circuit prevention member, opposite to the one surface, may oppose the housing.

In various embodiments, a first heat blocking member disposed between the plurality of battery cells; and a second heat blocking member disposed between the cell stack and the housing, may be further included.

In various embodiments, the second heat blocking member may oppose the cell stack in a third direction, wherein the third direction may be perpendicular to the first direction and the second direction.

In various embodiments, an end cover coupled to at least one side of the housing and facing the cell stack in the first direction, may be further included.

In various embodiments, the cover frame may include a support protrusion protruding toward the short-circuit prevention member to support the short-circuit prevention member.

In various embodiments, the support protrusion is inserted into the short-circuit prevention member and an end of the support protrusion is heat-sealed.

In various embodiments, the support protrusion may pass through the short-circuit prevention member.

In various embodiments, an adhesive member fixing the short-circuit prevention member and the cover frame to each other, may be further included.

BRIEF DESCRIPTION OF DRAWINGS

Certain aspects, features, and advantages of the disclosed technology may be illustrated by the following detailed description with reference to the accompanying drawings.

DETAILED DESCRIPTION

Figure 1:
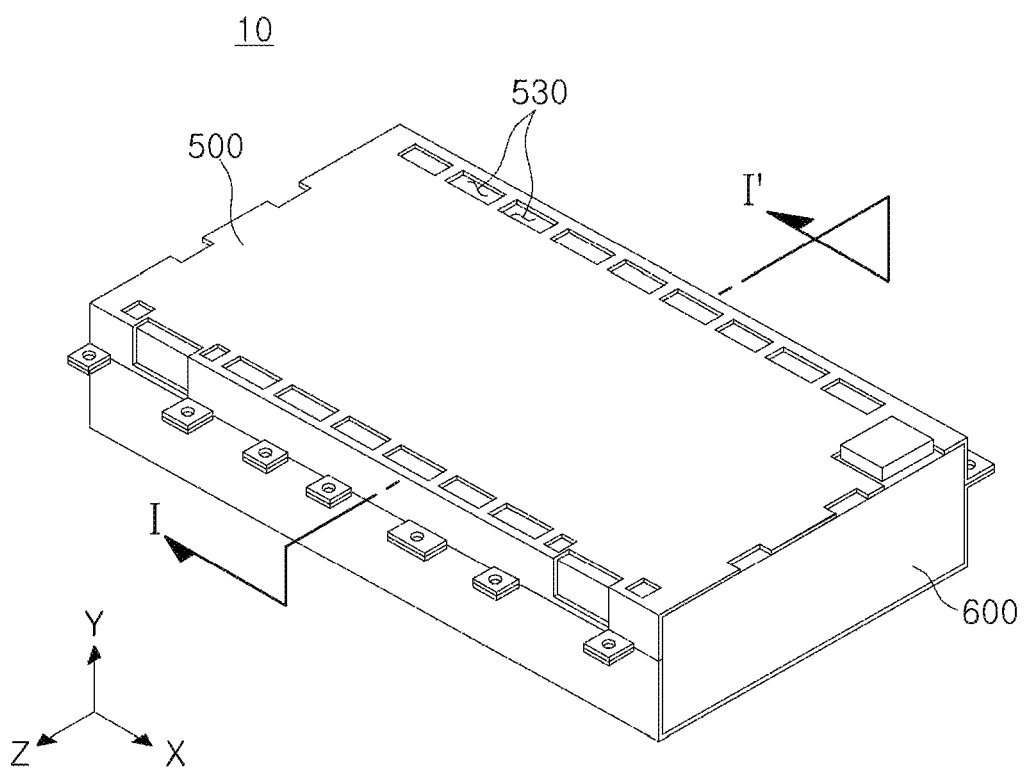
FIG. 1 is a perspective view of a battery module according to one embodiment of the disclosed technology.

Terms or words used in the specification and claims should be understood according to their plain and ordinary meaning unless definitions of these terms are explicitly set out below. Moreover, it should be understood that embodiments described in the specification and configurations illustrated in the drawings do not represent all the technological aspects of the present disclosure; there are readily apparent equivalents and variations to that disclosed.

The same reference number or numeral in each drawing attached to this specification indicates parts or components that perform substantially the same or similar function. For convenience of description and understanding, the same reference numerals or symbols may be used in different embodiments. That is, even if components having the same reference numerals may be illustrated in a plurality of drawings, the plurality of drawings do not all relate to one embodiment.

In the following description, singular expressions include plural expressions unless the context clearly dictates otherwise. It should be understood that the terms "include" or "comprise" is intended to indicate that there may be a feature, a numeral, a step, an operation, a component, a part, or a combination thereof, described in the specification, but the presence or addition of one or more of a feature, a numeral, a step, an operation, a component, a part, or a combination thereof, different from the above, It should be understood that steps, operations, components, parts, or combinations thereof is not precluded in advance.

In addition, in the following description, expressions of "upper," "upper side," "upper portion," "lower," "lower side," "lower portion," "side," "side surface," "front," "front surface," "rear," "rear surface," and the like may be described with reference to the drawings and denote relative positions between the objects with these descriptors. If a direction of an object is changed, these descriptors would be expressed differently.

In addition, in the present specification and claims, terms including an ordinal number, such as "first," "second," etc. used herein may be used to distinguish between components. These ordinal numbers may be used to distinguish the same or similar components from each other, and the meaning of the term should not be limitedly interpreted due to use of these ordinal numbers. For example, components combined with such ordinal numbers should not be construed as limiting use order or arrangement order by the number. As necessary, each of the ordinal numbers may be used interchangeably.

Hereinafter, embodiments of this patent document will be described with reference to the accompanying drawings. However, this patent document is not limited to the presented examples. For example, a person skilled in the art would recognize other embodiments as being within the scope of this patent document through addition, change, or deletion of components. Moreover, in the drawings, shapes and sizes of components in the drawings may be exaggerated for clarity.

Figure 2:
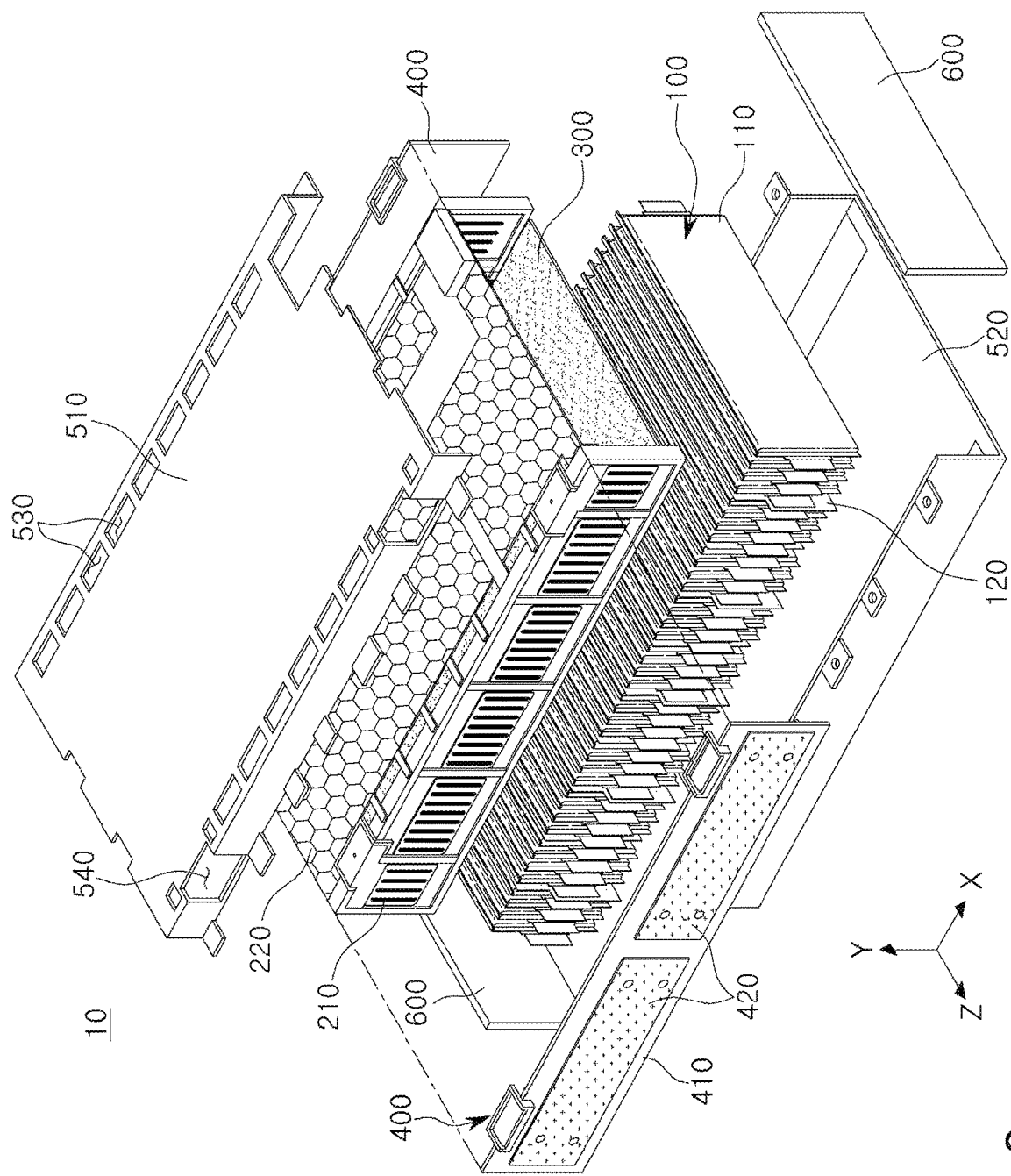
FIG. 2 is an exploded perspective view of the battery module of FIG. 1.

Referring to FIGS. 1 and 2, a battery module 10 according to embodiments will be described. FIG. 1 is a perspective view of a battery module 10. FIG. 2 is an exploded perspective view of a battery module 10.

The battery module 10 may include a housing 500 having an internal space, a plurality of battery cells 110 accommodated in the internal space, a busbar assembly 200 electrically connected to the battery cells 110, and an end cover 600 coupled to at least one side of the housing 500.

The plurality of battery cells 110 accommodated in the battery module 10 may be stacked in one direction (e.g., an X-axis direction of FIG. 2) to form at least a portion of a cell stack 100. Each of the battery cells 110 may output or store electrical energy. In the cell stack 100, the battery cells 110 may be electrically connected to each other.

As a large number of battery cells 110 are stacked on the battery module 10, there may be a risk that an event generated in one battery cell 110 is transferred to another battery cell. In addition, a high-temperature gas or a flame generated from the battery cell 110 may flow irregularly in the internal space of the housing 500 and may adversely affect the battery module 10. For example, the gas or the flame may damage components in the battery module 10 while flowing between the cell stack 100 and the housing 500, and a short circuit may occur between the components in the battery module 10 due to a spray of conductive particles. In addition, in a process of flowing the gas or the flame between the cell stack 100 and the housing 500, an unintended heat propagation path may be formed, which may further aggravate a thermal runaway condition.

To prevent this occurrence, the battery module 10 may include a first heat blocking member 120 and a second heat blocking member 300.

For example, the cell stack 100 may include the first heat blocking member 120 disposed between the battery cells 110. The first heat blocking member 120 may prevent heat propagation between neighboring battery cells 110. The first heat blocking member 120 may serve to protect the battery cell 110 from physical and thermal shock. For example, the first heat blocking member 120 may be configured to block heat propagation from one battery cell 110 to another battery cell 110, or may be configured to absorb expansion pressure of the battery cell 110.

The plurality of battery cells 110 and the plurality of first heat blocking members 120 may be stacked in various directions to form the cell stack 100. For example, as illustrated in FIG. 2, the plurality of battery cells 110 and a plurality of protection members may be stacked on a lower case 520 of the housing 500 in a horizontal direction (the X-axis direction in FIG. 2). However, FIG. 2 is only illustrative, and the plurality of battery cells 110 and the plurality of protection members may be stacked in a direction, perpendicular to the lower case 520 of the housing 500 (a Y-axis direction or a Z-axis direction in FIG. 2). In the following description, a stacking direction of the battery cells 110 may be referred to as a first direction or a cell stacking direction.

The battery module 10 may include the second heat blocking member 300 opposing at least one side of the cell stack 100. The second heat blocking member 300 may cover one side of the cell stack 100 (e.g., the upper side of cell stack 100) to prevent an unexpected heat propagation path between the cell stack 100 and the housing 500 from being generated.

At least a portion of the first heat blocking member 120 may overlap or engage with the second heat blocking member 300. For example, at least one portion of each of the plurality of first heat blocking members 120, spaced apart in the first direction, may be configured to be inserted into (or otherwise contact) the second heat blocking member 300 in the second direction (Y-axis direction) so as to engage each other. As the first heat blocking member 120 and the second heat blocking member 300 are engaged with each other, these components form an insulating compartment, and a high-temperature thermal energy or flame generated in one of the battery cells 110 may be prevented from being propagated to other neighboring battery cells 110, and may be prevented from indiscriminately flowing in a space between the cell stack 100 and the housing 500.

The plurality of battery cells 110 included in the cell stack 100 may be electrically connected to each other through the busbar assembly 200. At least a portion of the busbar assembly 200 may be disposed to face the cell stack 100 in a direction, perpendicular to the cell stacking direction.

The busbar assembly 200 may include a busbar 210 electrically connecting one battery cell 110 and another battery cell 110, and a busbar frame 220 supporting the busbar 210.

The busbar 210 may be formed of a conductive material, and may serve to electrically connect the plurality of battery cells 110 to each other. The busbar 210 may be electrically connected to a lead tab (e.g., tab 113 of FIG. 3) of the battery cell 110. Various welding methods including laser welding or the like may be applied to make the connection between the busbar 210 and the lead tab 113 (in FIG. 3). The connection method is not limited to the welding, and any connection method capable of electrically conducting two metallic materials is possible.

The busbar assembly 200 may include a terminal portion 230 (see FIG. 6) that may be electrically connected to an external circuit of the battery module 10. The terminal portion 230 may be exposed to an outside of the battery module 10 through an opening 540 of the housing 500.

The battery module 10 may further include a sensing module connected to the busbar assembly 200. The sensing module may include a temperature sensor, a voltage sensor, or the like. The sensing module may sense a state of the battery cell 110, and may output the sensed information to the outside of the battery module 10.

The housing 500 may provide the internal space in which one or more cell stacks 100 may be accommodated. The housing 500 may be formed of a material having a predetermined rigidity to protect the cell stack 100 and other electric and electronic components accommodated in the internal space from external impact. For example, the housing 500 may include a metal material such as aluminum or the like.

The housing 500 may include a lower case 520 and an upper case 510, coupled to each other. A structure of the housing 500 is not limited thereto, and may have any shape as long as it has an internal space in which at least one cell stack 100 may be accommodated. For example, the housing 500 may be configured as an integral monoframe in which the upper case 510 and the lower case 520 are integrally formed and both side surfaces thereof may be exposed.

The housing 500 may include a venting hole 530 through which gas generated from the cell stack 100 may be discharged. For example, the venting hole 530 may have a shape of a hole passing through the lower case 520 or the upper case 510.

Figure 7:
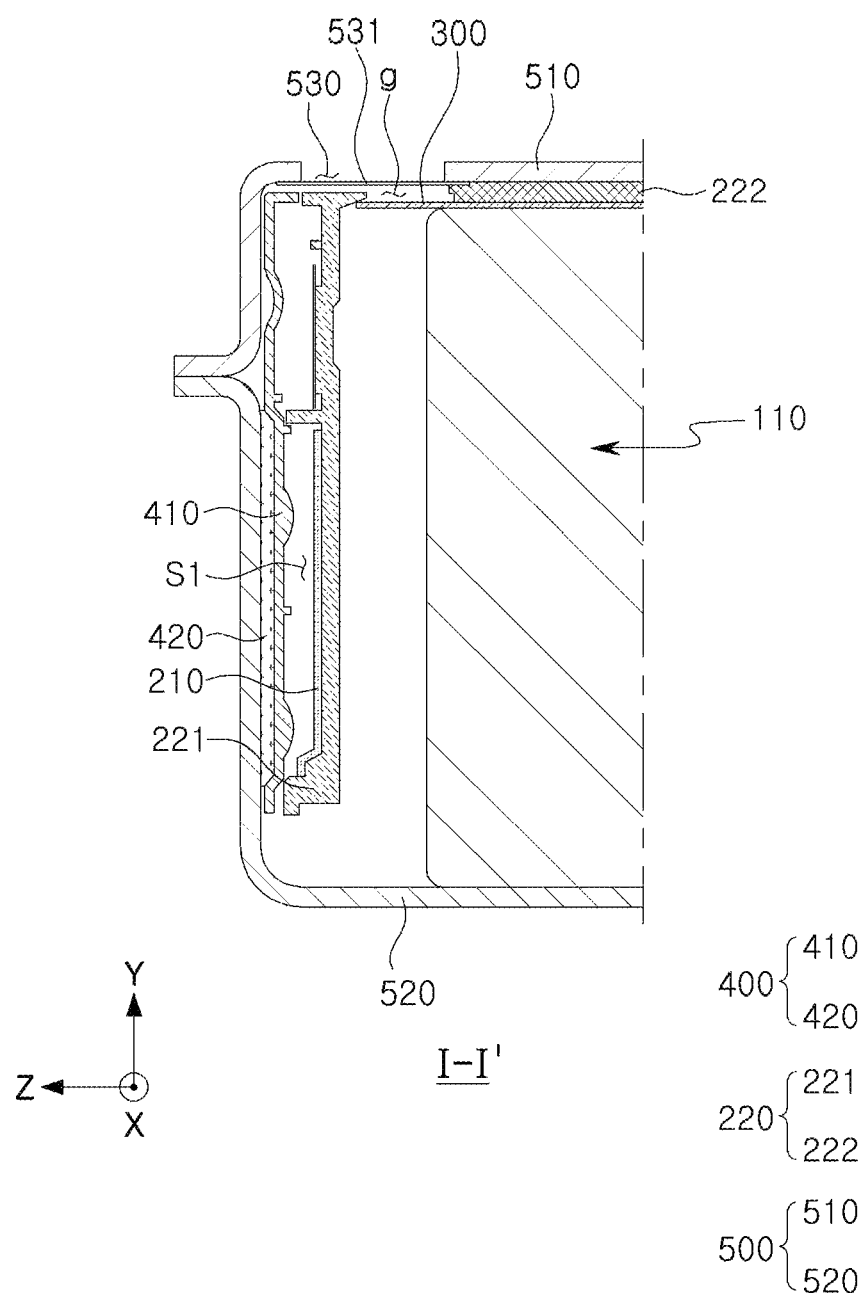
FIG. 7 is a cross-sectional view illustrating a battery module having an insulation cover assembly according to another embodiment of the disclosed technology.

A shielding member 531 (as shown in FIG. 7) may be disposed in the venting hole 530. The shielding member 531 may be formed of a thin film or sheet, and may block a foreign substance from being introduced from the outside of the battery module 10. The shielding member 531 may include a material that is of low density and has high impact resistance, heat resistance, and/or electrical insulation. For example, the shielding member 531 may include a polycarbonate sheet. Under a thermal runaway condition of the battery module 10, at least a portion of the shielding member 531 may be torn such that gas emitted from the cell stack 100 may pass through properly.

To prevent an electrical short circuit between the busbar assembly 200 and the housing 500, the battery module may include an insulation cover assembly 400. For example, as illustrated in FIG. 2, the insulation cover assembly 400 may be disposed to face the busbar assembly 200 between the busbar assembly 200 and the housing 500. The insulation cover assembly 400 may include a short-circuit prevention member 420 preventing a short circuit between the busbar 210 and the housing 500, and a cover frame 410 to which the short-circuit prevention member 420 is fixed.

Each of the short-circuit prevention member 420 and the cover frame 410 may include an insulating material to prevent an electrical short circuit between the conductive busbar 210 and the housing 500.

The cover frame 410 may include a material that is of low density and has high insulation and rigidity. For example, the cover frame 410 may include a plastic product (which may be formed by injection) including polypropylene, modified polyphenylene oxide (MPPO), or the like. The material of the cover frame 410 is not limited thereto.

As a high-temperature gas or a flame is released under a thermal runaway condition of the cell stack 100, conductive particles may be stacked between the busbar 210 and the housing 500, to cause an electrical short circuit between the busbar 210 and the housing 500, thereby accelerating the thermal runaway condition.

To prevent this occurrence, the insulation cover assembly 400 of the battery module 10 may include a short-circuit prevention member 420 formed of a material different from that of the cover frame 410. For example, the short-circuit prevention member 420 and the cover frame 410 may include an insulating material, but the material included in the short-circuit prevention member 420 may be configured to have a higher melting point than that of the cover frame 410.

The short-circuit prevention member 420 may be coupled to the cover frame 410, and may be disposed between the busbar and the housing. For example, as illustrated in FIG. 2, the short-circuit prevention member 420 may be fixed to one surface of the cover frame 410, and may be disposed to oppose the housing 500.

As the short-circuit prevention member 420 having a strong resistance to a high-temperature gas or a flame is disposed, occurrence of an electrical short circuit may be prevented between the cell stack 100 and the housing 500 or between the busbar 210 and the housing 500 under a thermal runaway condition.

A heat dissipation member may be disposed between the cell stack 100 and the housing 500. The heat dissipation member may be disposed such that one surface thereof is in contact with the cell stack 100 and the other surface thereof, opposite to the one surface, is in contact with the housing 500. The heat dissipation member may be provided with a thermal adhesive. The heat dissipation member may fill a space between the cell stack 100 and the housing 500 such that heat transfer by conduction may be more actively performed. Therefore, heat dissipation efficiency of the battery module 10 may increase.

The end cover 600 may be coupled to one open side of the housing 500. For example, as illustrated in FIG. 2, the end cover 600 may be provided as a pair of end covers, and the pair of end covers may be coupled to both sides of the housing 500, respectively.

The end cover 600 may oppose the cell stack 100 in the first direction (the X-axis direction). Referring to FIG. 2, the housing 500 may have a shape having both sides exposed in the first direction, and the pair of end covers 600 may be configured to be coupled to the housing 500 in the first direction (the X-axis direction) and close the exposed portion of the housing 500.

The end cover 600 and the insulation cover assembly 400 may be disposed to face the cell stack 100 in different directions. For example, as illustrated in FIG. 2, the insulation cover assembly 400 opposes the cell stack 100 and the busbar assembly 300 in the second direction (the Y-axis direction), and the end cover 600 may be disposed to oppose the cell stack 100 in the first direction (the X-axis direction).

Hereinafter, the cell stack 100 included in the battery module (e.g., 10 in FIGS. 1 and 2) will be described with reference to FIGS. 3 to 5.

Figure 3:
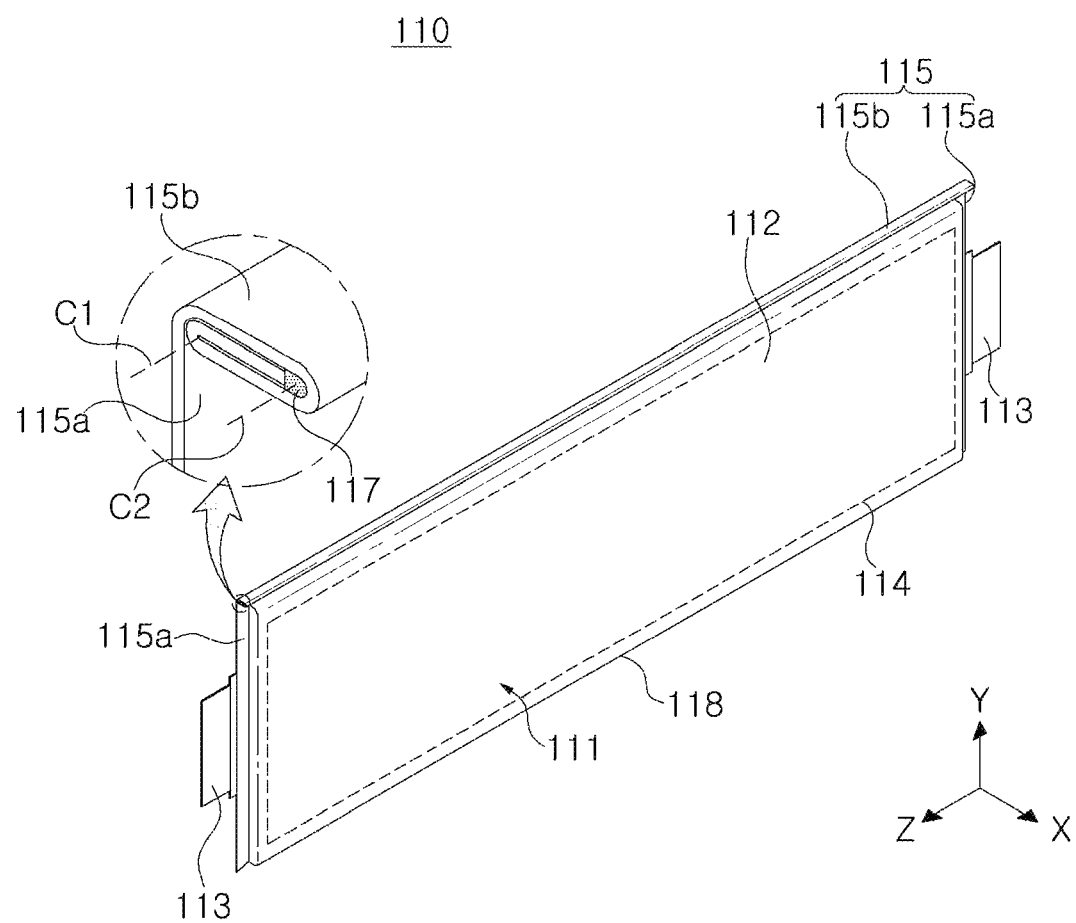
FIG. 3 is a perspective view of a battery cell included in a cell stack according to another embodiment of the disclosed technology.
Figure 4:
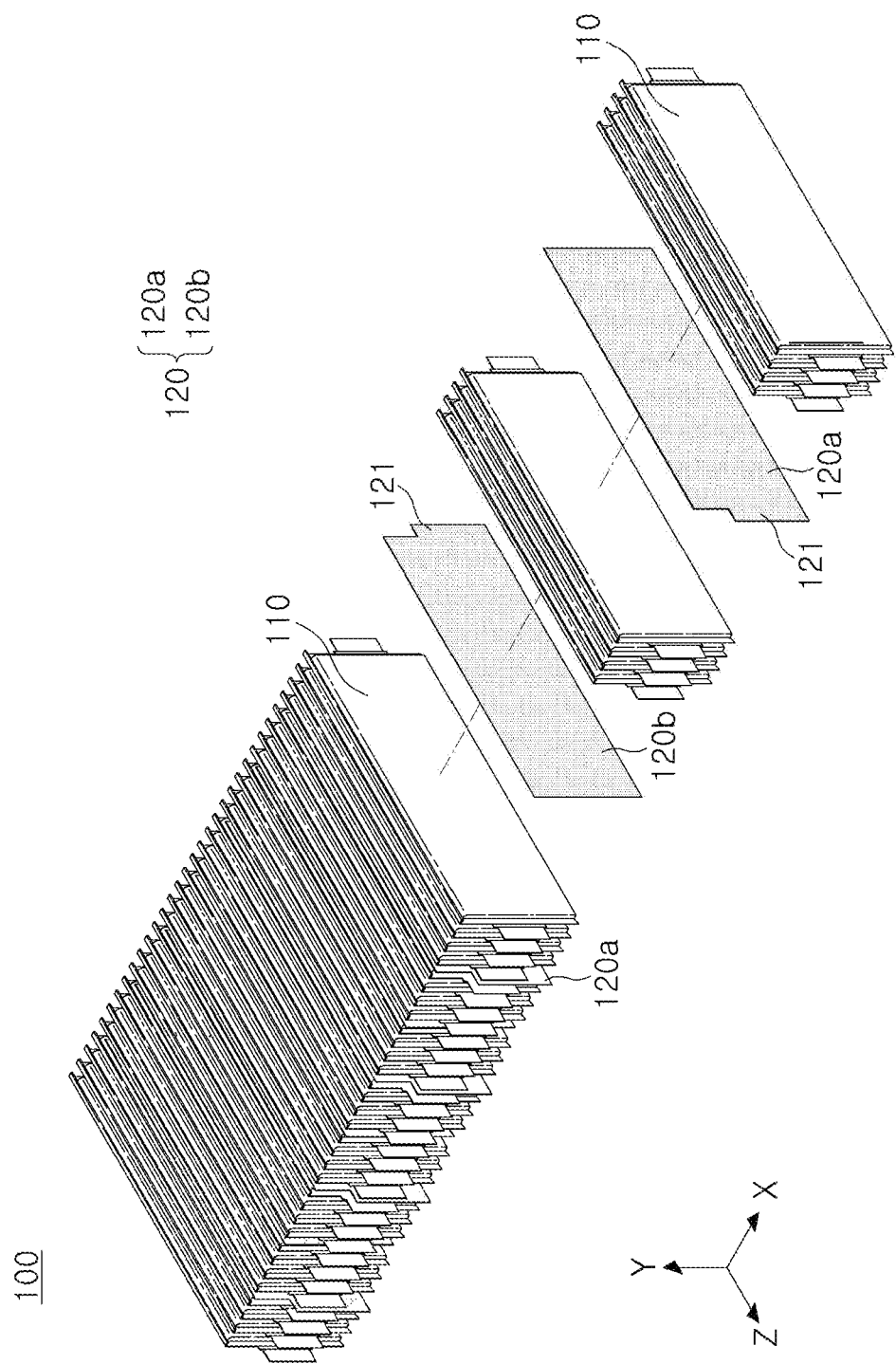
FIG. 4 illustrates a configuration of a cell stack according to still another embodiment of the disclosed technology.

FIG. 3 is a perspective view of a battery cell 110 included in a cell stack 100. FIG. 4 illustrates a configuration of a cell stack 100. FIG. 5 illustrates a configuration in which a battery cell 110 and a first heat blocking member 120 are stacked. Since a battery cell 110, a first heat blocking member 120, and a cell stack 100, described in FIGS. 3 to 5, may correspond to the battery cell 110, the first heat blocking member 120, and the cell stack 100, described in FIGS. 1 and 2, overlapping descriptions thereof may be omitted.

A battery cell 110 included in a cell stack 100 may be a pouch-type secondary battery capable of charging and discharging electricity. Referring to FIG. 3, a battery cell 110 may include an electrode accommodating portion 112 having a configuration in which an electrode assembly 114 is accommodated in a pouch 111, and a plurality of lead tabs 113 electrically connected to the electrode assembly 114 and exposed to an outside of the pouch 111. In the battery cell 110 illustrated in FIG. 3, two (2) lead tabs 113 are illustrated as being drawn out from the electrode accommodating portion 112 in opposite directions, but may be configured to be drawn from either side of the electrode accommodating portion 112 in the same direction.

The pouch 111 may surround the electrode assembly 114, may form an exterior of the electrode accommodating portion 112, and may provide an internal space in which the electrode assembly 114 and an electrolyte solution are accommodated. The pouch 111 may be formed by folding a sheet of exterior material. For example, the pouch 111 may be configured in a form in which a sheet of exterior material is folded in half and the electrode assembly 114 is accommodated therebetween. The exterior material may be formed of a material capable of protecting the electrode assembly 114 from an external environment, and may include, for example, an aluminum film.

The exterior material may be bonded to an edge of the pouch 111 to form a sealing portion 115. A thermal fusion method may be used to bond the exterior material for forming the sealing portion 115, but the present disclosure is not limited thereto.

The sealing portion 115 may be divided into a first sealing portion 115a formed in a position in which a lead tab 113 is disposed, and a second sealing portion 115b formed in a position in which the lead tab 113 is not disposed. To increase reliability of bonding of the sealing portion 115 and to minimize an area of the sealing portion 115, at least a portion of the sealing portion 115 may be formed to have a folded form one or more times. For example, the second sealing portion 115b may be folded 180° along a first bending line C1, and may be then folded again along a second bending line C2. In this case, an adhesive member 117 may be filled in a bent portion of the second sealing portion 115b. Therefore, the second sealing portion 115b may maintain a twice-folded shape by the adhesive member 117. The adhesive member 117 may be formed of an adhesive having a relatively high thermal conductivity. For example, the adhesive member 117 may be formed of epoxy or silicone, but is not limited thereto.

The sealing portion 115 may not be formed on a surface on which the pouch 111 is folded along one edge of the electrode assembly 114. A portion of the pouch 111, which is folded along the one edge of the electrode assembly 114, may be defined as a folding portion 118, to distinguish the same from the sealing portion 115. For example, the pouch 111 type battery cell 110 may be a three-sided sealing pouch in which the sealing portion 115 is formed on three (3) surfaces out of four (4) surfaces of an edge of the pouch 111, and the folding portion 118 is formed on the remaining one (1) surface.

A battery cell 110 of embodiments is not limited to the three-sided sealing pouch 111 described above. For example, it is also possible to form the pouch 111 by overlapping two (2) sheets of different exterior materials, and to form the sealing portion 115 on all four surfaces around the pouch 111.

In addition, the battery cell 110 included in a battery module 10 of embodiments is not limited to the pouch 111 type battery cell 110 described above, but may be also provided as a cylindrical battery cell 110 or a prismatic battery cell 110.

The cell stack 100 may include a plurality of battery cells 110 and a plurality of first heat blocking members 120. Referring to FIG. 4, a plurality of first heat blocking members 120 may be arranged side by side at predetermined intervals in the cell stacking direction (e.g., the X-axis direction of FIG. 4). One or more battery cells 110 may be disposed between two (2) adjacent first heat blocking members 120. In the drawing, four (4) battery cells 110 may be stacked between the two (2) first heat blocking members 120, but this arrangement is merely illustrative, and other arrangements including three (3) or less or five (5) or more battery cells 110 may be arranged between the two (2) first heat blocking members 120. The present disclosure is not limited to these illustrative arrangements.

A first heat blocking member 120 may include an insertion portion 121 inserted into a busbar assembly (e.g., 200 in FIG. 2). Referring to FIG. 4, a first heat blocking member 120 may include an insertion portion 121 protruding in a direction (e.g., the Z-axis direction) toward a busbar (e.g., 210 in FIG. 2). At least a portion of the insertion portion 121 may be inserted into a busbar assembly 200. For example, the at least a portion of the insertion portion 121 may be inserted into a busbar frame 220.

The insertion portion 121 may be inserted into the busbar frame 220 while avoiding the busbar 210. For example, an insertion position of the insertion portion 121 may be between two (2) proximate busbars 210. For example, the insertion portion 121 of the first heat blocking member 120 may be inserted into the busbar frame 220, and may be disposed between the two (2) proximate busbars 210. Therefore, the insertion portion 121 may prevent the two (2) busbars 210 from physically contacting each other.

The insertion portion 121 may be formed at either edge of the first heat blocking member 120. When the plurality of first heat blocking members 120 are disposed in the cell stacking direction, a first heat blocking member 120 having an insertion portion 121 at one end thereof and a first heat blocking member 120 having an insertion portion 121 at the other end thereof may be alternately disposed. For example, as illustrated in FIG. 4, in a cell stack 100 in which the plurality of first heat blocking members 120 are disposed in the X-axis direction, an insertion portion 121 of one first heat blocking member 120 may be disposed in a positive Z-axis direction, and an insertion portion 121 of the other first heat blocking member 120, adjacent thereto, may be disposed in a negative Z-axis direction. According to this arrangement, the insertion portion 121 of the first heat blocking member 120 may be inserted into the busbar frame 220 while avoiding the busbar 210.

The first heat blocking member 120 may be formed of a combination of members having different properties. For example, referring to FIG. 5, a first heat blocking member 120 may include a heat insulating member 122 and a compression member 123, coupled to each other.

The first heat blocking member 120 may include at least one heat insulating member 122, to block propagation of heat and/or flames between adjacent battery cells 110.

The heat insulating member 122 may include a material having at least one of a flame retardant property, a heat resistant property, a heat insulation property, and/or an insulation property. In this case, the heat resistant property may have a property that does not melt and does not change its shape even at a temperature of 300 degrees Celsius or more, and the heat insulation property may be thermal conductivity of 1.0 W/mK or less. For example, the heat insulating member 122 may include at least one or more of the following materials: a mica sheet, silicate, graphite, alumina, ceramic wool, super wool, or an airgel.

A material of the heat insulating member 122 is not limited to the above-mentioned materials, and may be formed of any material that can maintain a shape thereof under a thermal runaway condition of the battery cell 110, and can prevent heat or flame from propagating to other adjacent battery cells 110.

To maximize an energy density of the cell stack 100, a thickness of the heat insulating member 122 may be smaller than a thickness of one battery cell 110. In this case, the thickness may have a length in the cell stacking direction.

The first heat blocking member 120 may further include at least one compression member 123 fixed to the heat insulating member 122. The compression member 123 when installed may press against the battery cell 110 with a predetermined elastic force, to prevent the battery cell 110 from expanding due to a swelling phenomenon. For example, the compression member 123 may include at least one of polyurethane, silicone, or a rubber (EPDM), and may exert pressure against the battery cell 110 using elasticity of these materials.

The compression member 123 may be disposed such that one surface thereof (a first surface) opposes the battery cell 110 and the other surface thereof (a second surface), opposite to the one surface, opposes the heat insulating member 122. For example, as illustrated in FIG. 5, the first heat blocking member 120 may have a sandwich structure in which a plurality of compression members 123 are disposed with the heat insulating member 122 interposed therebetween.

An area of the compression member 123 may be equal to or greater than an area of an electrode accommodating portion (e.g., electrode accommodating portion 112 of FIG. 3) of the battery cell 110 opposing the compression member 123. Therefore, the compression member 123 may effectively absorb and buffer an expansion pressure caused by swelling of the battery cell 110.

The first heat blocking member 120 may further include a fixing member disposed on at least one side of the compression member 123. For example, the fixing member may be disposed between the heat insulating member 122 and the compression member 123 and between the battery cell 110 and the compression member 123. The fixing member may include a material having an adhesive strength, for example, a silicon-based material, an acrylic-based material, a rubber-based material, a hot-melt-based material, an epoxy-based material, a PSA-based material, and/or an urethane-based material. The fixing member may be an adhesive tape of a substrate type, a substrate-less type, or a pressure sensitive adhesive (PSA) hot melt type.

Figure 5:
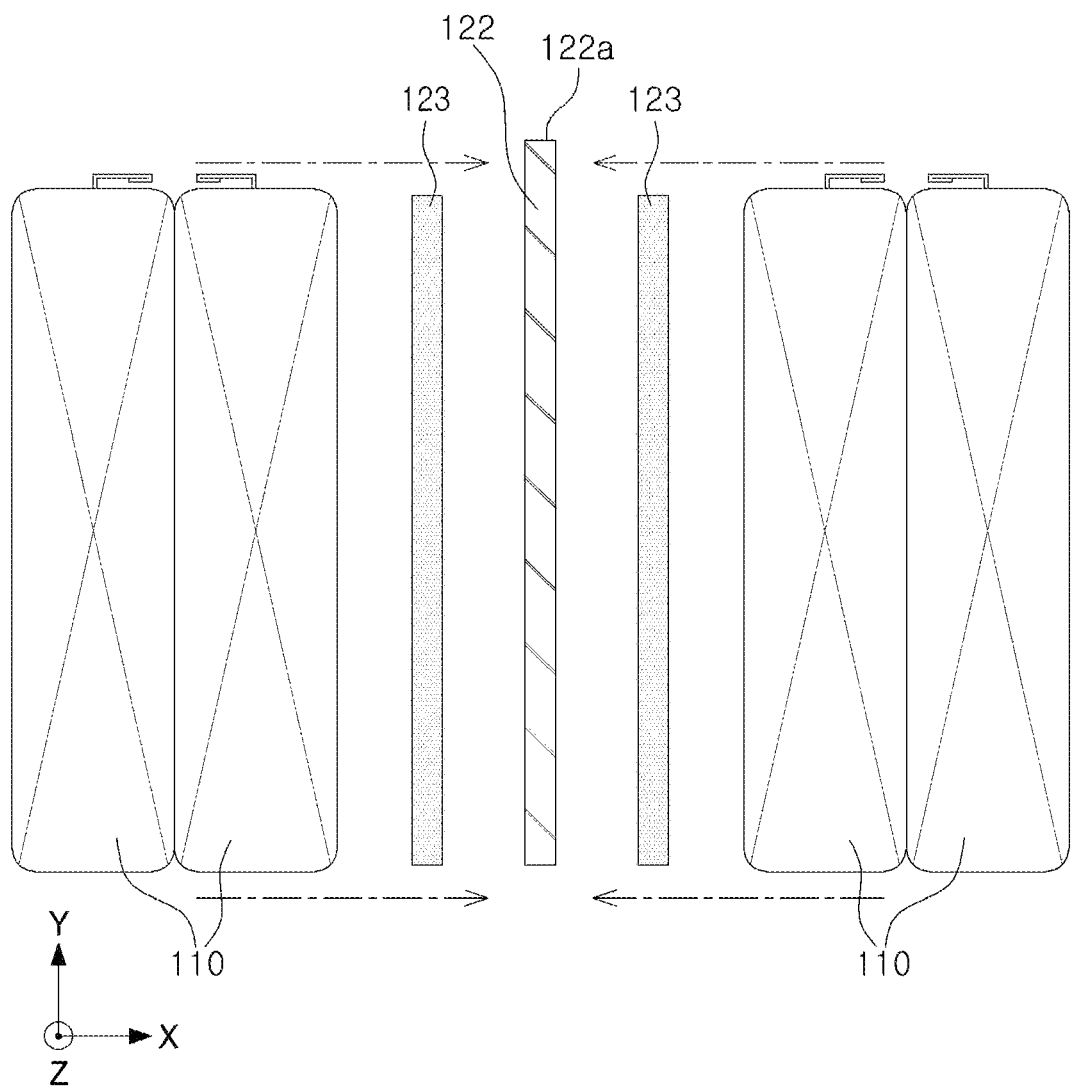
FIG. 5 illustrates a configuration according to yet another embodiment of the disclosed technology in which a battery cell and a first heat blocking member are stacked.

As illustrated in FIG. 5, at least a portion of the heat insulating member 122 may further protrude in a second direction (e.g., the Y-axis direction), perpendicular to the first direction (e.g., the X-axis direction), relative to the compression member 123 and the battery cell 110. In this case, the second direction may be a direction from the cell stack 100 toward the upper case (e.g., 510 in FIG. 2) or the lower case (e.g., 520 in FIG. 2). As such, a portion of the heat insulating member 122 further protruding in the second direction, relative to the compression member 123 and the battery cell 110, defines a protruding portion 122a of the heat insulating member 122.

When a different component (e.g., the second heat blocking member 300 described in FIG. 2) is disposed above or below the cell stack 100, the different component may be in closest contact with the protruding portion 122a of the heat insulating member 122, among components of the cell stack 100. With this structure, it is possible to more effectively prevent a high-temperature gas or a flame generated in the battery cell 110 from being transferred to other battery cells 110 beyond the heat insulating member 122.

Figure 6:
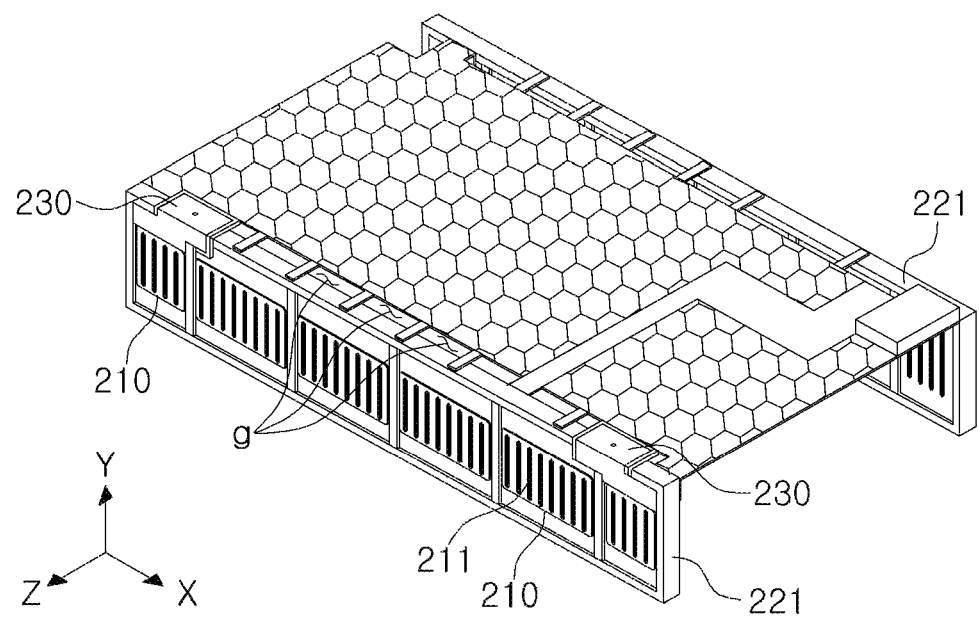
FIG. 6 is a perspective view of a busbar assembly included in the battery module of FIG. 1.

Hereinafter, a busbar assembly 200 included in a battery module (e.g., battery module 10 in FIGS. 1 and 2) will be described with reference to FIG. 6, which is a perspective view of a busbar assembly 200 included in a battery module 10. Since the busbar assembly 200 described in FIG. 6 corresponds to the busbar assembly 200 described above with reference to FIGS. 1 to 5, overlapping descriptions thereof may be omitted.

A plurality of battery cells 110 included in a battery module 10 may be electrically connected to each other through a busbar assembly 200.

The busbar assembly 200 may include a plurality of bus bars 210 electrically connected to the battery cells 110 and made of a conductive material, and a busbar frame 220 supporting the busbars 210.

The plurality of busbars 210 may be arranged side by side in the cell stacking direction (e.g., the X-axis direction) on the busbar frame 220. Each of the busbars 210 may include a slit hole 211 into which lead tabs 113 of the plurality of battery cells 110 are inserted and welded.

The busbar frame 220 may structurally support the busbar 210 even under an external shock or vibration condition. For example, the busbar frame 220 may be formed of a plastic material that may be lightweight and has excellent mechanical strength, such as polypropylene, polybutylene terephthalate, modified polyphenylene oxide (MPPO), or the like. Therefore, it is possible to structurally support the busbar 210 while securing insulation.

The busbar 210 may be fixed to the busbar frame 220 in various manners. For example, the busbar 210 may be fixed to the busbar frame 220 by a heat welding process or an insert injection process.

The busbar frame 220 may include a first frame 221 on which the busbar 210 is disposed, and a second frame 222 disposed between a cell stack 100 and a housing 500. For example, referring to FIG. 6, the busbar assembly 200 may include a pair of first frames 221 facing each other, and a second frame 222 connected to the pair of both first frames 221.

A venting gap g, which may be a space through which gas may pass, may be formed between the first frame 221 and the second frame 222. Gas or a flame generated in the cell stack 100 may pass through the busbar assembly 200 via the venting gap g, and may flow toward a venting hole 530 of the housing (e.g., housing 500 in FIG. 2).

Hereinafter, arrangement of a busbar assembly 220 and an insulation cover assembly 400 will be described with reference to FIG. 7, which is a cross-sectional view illustrating a battery module 10 having an insulation cover assembly 400. Since an insulation cover assembly 400 and a battery module 10, described in FIG. 7, may correspond to the insulation cover assembly 400 and the battery module 10, previously described in FIGS. 1 to 6, overlapping descriptions thereof may be omitted.

A busbar assembly 220 may include a first frame 221 facing a battery cell 110 in the second direction (e.g., the Z-axis direction) and supporting a busbar, and a second frame 222 facing the battery cell 110 in the third direction (e.g., the Y-axis direction). In this case, the third direction (the Y-axis direction) may be a direction, perpendicular to both the cell stacking direction (e.g., the X-axis direction) and the second direction (the Z-axis direction).

Gas or a flame generated in the battery cell 110 may escape through a venting gap g between a first frame 221 and a second frame 222. To smoothly discharge the gas, the venting gap g may be disposed to face a venting hole 530 of a housing 500.

A second heat blocking member 300 may be disposed between the battery cell 110 and the second frame 222, to prevent formation of an unintentional heat transfer path between the battery cell 110 and the housing 500. The second heat blocking member 300 may oppose the battery cell 110 in the third direction (the Y-axis direction), and may be configured to pressurize the battery cell 110 when experiencing a thermal runaway with a predetermined pressure. Therefore, formation of a heat propagation path on an upper end of the battery cell 110 may be blocked, and gas or a flame generated in the battery cell 110 may be prevented from propagating to a different portion in the module.

The second heat blocking member 300 may include ceramic wool. Therefore, the second heat blocking member 300 may capture a combustion particle without bouncing it off, to absorb impact energy due to thermal runaway and prevent secondary damage due to scattering of the combustion particle.

At least a portion of the second frame 222 of the busbar frame 220 may be configured to be disposed between the second heat blocking member 300 and the housing 500, and act with the second heat blocking member 300 under a thermal runaway condition. Therefore, loss of the second heat blocking member 300 due to hot air may be prevented.

When the housing 500 of a battery module 10 includes a metal material, a conductive busbar 210 and the housing 500 may be electrically short-circuited to each other. To prevent this, an insulation cover assembly 400 may be disposed between the busbar 210 and the housing 500.

The insulation cover assembly 400 may include a cover frame 410 and a short-circuit prevention member 420, formed of an insulating material.

The cover frame 410 and the short-circuit prevention member 420 may be disposed to face each other in a direction, perpendicular to the cell stacking direction. For example, the cover frame 410 may be disposed between the busbar 210 and the housing 500, facing each other in the second direction (the Z-axis direction), and the short-circuit prevention member 420 may be fixedly arranged on one surface of the cover frame 410. Referring to FIG. 7, one surface of the short-circuit prevention member 420 (a first surface) may face the cover frame 410, and the other surface thereof (a second surface), opposite to the one surface, may face the housing 500.

To prevent contact between the insulation cover assembly 400 and the busbar 210, the battery module 10 may be configured to have a predetermined interval (or space) S1 between the insulation cover assembly 400 and the busbar 210. For example, as illustrated in FIG. 7, the busbar 210 and the insulation cover assembly 400 may be arranged to be spaced apart from each other at a predetermined interval S1 in the second direction (the Z-axis direction).

To prevent an electrical short circuit between the busbar 210 and the housing 500 in a situation where at least a portion of the cover frame 410 may be melted or burned by a high-temperature gas or a flame, the short-circuit prevention member 420 may include a material that may be better able to withstand higher temperature environments, compared to the cover frame 410. For example, when the cover frame 410 is formed of an injection-molded plastic material, the short-circuit prevention member 420 may include a material having a higher melting point (e.g., 800 degrees Celsius or higher) than that of the plastic material.

Alternatively, the short-circuit prevention member 420 may include a material that may be incombustible or flame retardant at about 800 degrees Celsius. Alternatively, the short-circuit prevention member 420 may include a material having a thermal conductivity of less than 1.0 W/mk, and a material having a weight of 60% or more in a thermogravimetric analysis (TGA) test heated to 800 degrees Celsius. The short-circuit prevention member 420 may include a non-flammable material or a flame-retardant material, such that the insulation cover assembly 400 may structurally endure even when exposed to a high-temperature gas or a flame.

The short-circuit prevention member 420 may include at least one of a mica sheet, silicate, graphite, alumina, ceramic wool, super wool, and/or an airgel. A material of the short-circuit prevention member 420 is not limited to the above materials, and may be formed of any material that can maintain a shape thereof under a thermal runaway condition of the battery cell 110, and can prevent a short circuit between the busbar 210 and the housing 500 or between the cell stack 100 and the housing 500.

The short-circuit prevention member 420 may have a larger area than the busbar 210, and may be disposed to oppose the busbar 210 in the second direction (the Z-axis direction). (In this case, the 'area' may mean a width of a surface, perpendicular to the second direction (the Z-axis direction).) Therefore, due to the larger area, formation of an electrical circuit by conductive particles may be better blocked between the busbar 210 and the housing 500.

Figure 8:
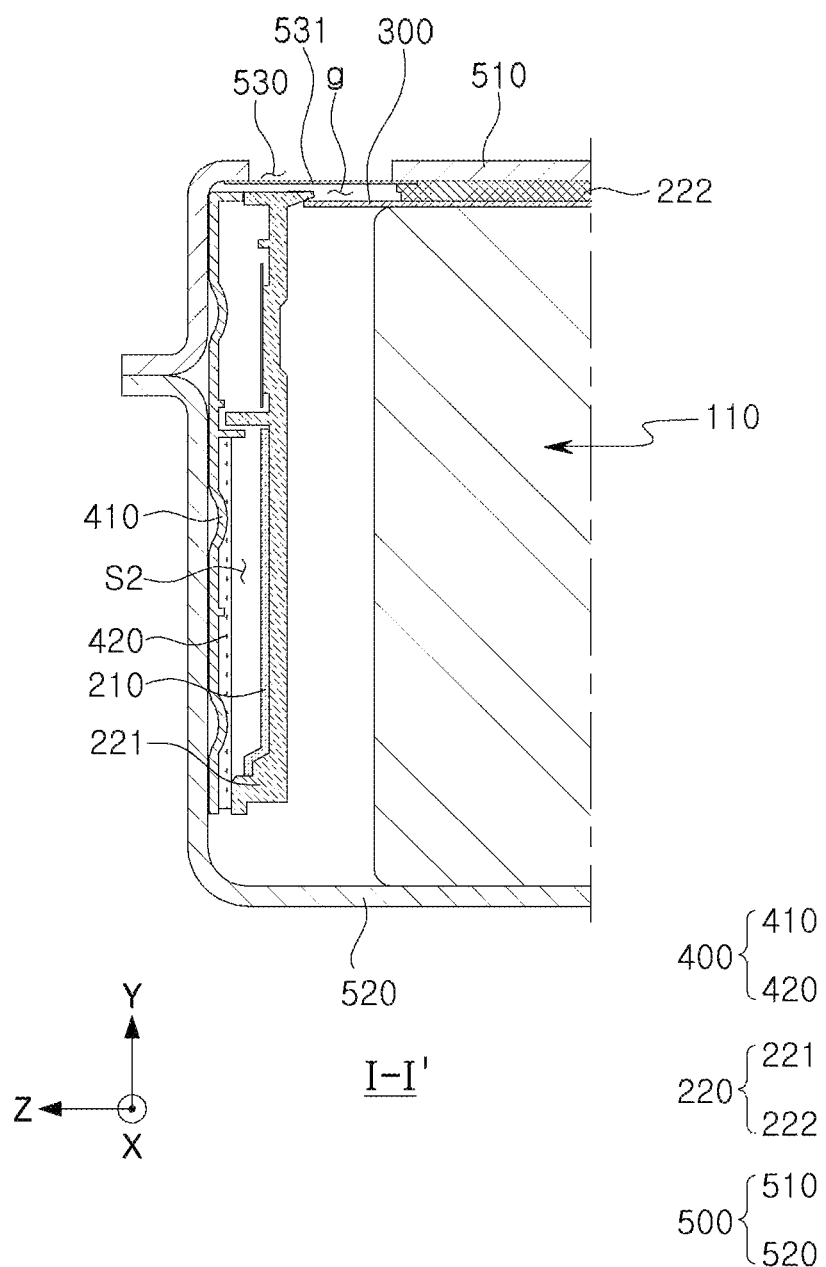
FIG. 8 is a cross-sectional view illustrating a battery module having an insulation cover assembly according to still another embodiment of the disclosed technology.

Arrangement of the short-circuit prevention member 420 and the cover frame 410 is not limited to the above descriptions. FIG. 8 is a cross-sectional view illustrating a battery module 10 having an insulation cover assembly 400 according to another embodiment. As illustrated in FIG. 8, a short-circuit prevention member 420 may be disposed such that one surface thereof (a first surface) opposes a busbar 210 and the other surface thereof (a second surface), opposite to the one surface, opposes a cover frame 410. As the short-circuit prevention member 420 is disposed closer to battery cell 110 and busbar 210, accumulation during thermal runaway of combustion particles between the busbar 210 and a housing 500 may be more reliably prevented.

When the short-circuit prevention member 420 is in direct contact with the busbar 210, heat may be generated. To prevent the short-circuit prevention member 420 from contacting the busbar 210, the short-circuit prevention member 420 may be disposed to be spaced apart from the busbar 210 at a predetermined interval (or space). Referring to FIG. 8, the short-circuit prevention member 420 may be spaced apart from the busbar 210 in the second direction (the Z-axis direction), to form a predetermined separation space S2 therebetween.

An insulation cover assembly 400 illustrated in FIG. 8 may have all the features of the insulation cover assembly 400 described in FIG. 7, except for an arrangement position of the short-circuit prevention member 420.

Figure 9:
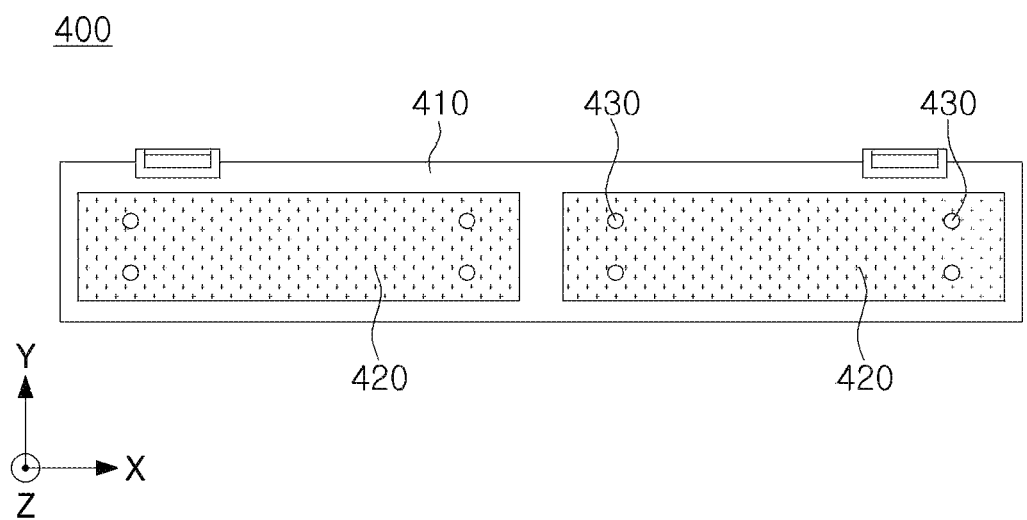
FIG. 9 illustrates a configuration according to yet another embodiment of the disclosed technology in which a short-circuit prevention member is coupled to a cover frame.
Figure 10:
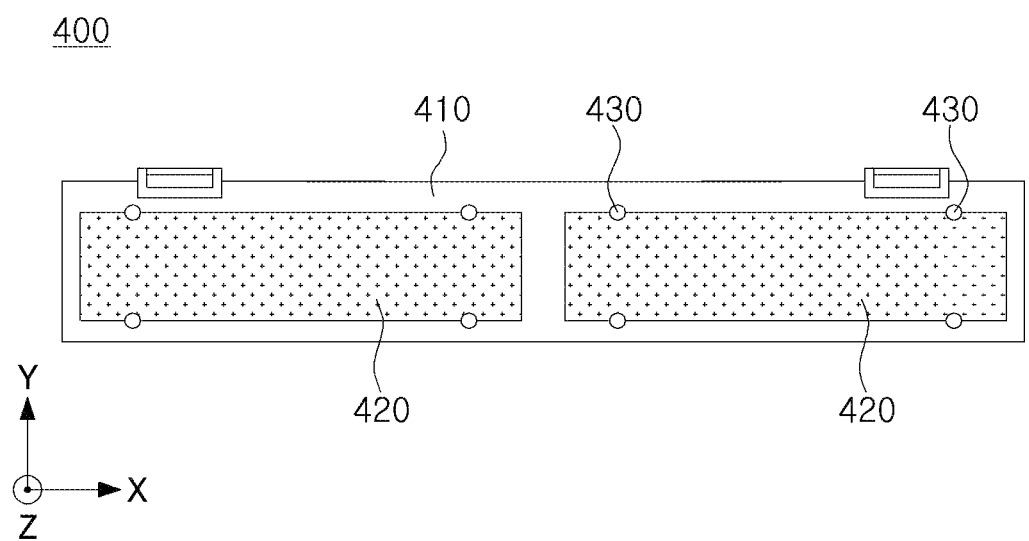
FIG. 10 illustrates a configuration according to a further embodiment of the disclosed technology in which a short-circuit prevention member is coupled to a cover frame.

The short-circuit prevention member 420 may be fixed to the cover frame 410. Hereinafter, coupling between the cover frame 410 and the short-circuit prevention member 420 will be described with reference to FIGS. 9 and 10. FIGS. 9 and 10 illustrate a configuration in which a short-circuit prevention member 420 is coupled to a cover frame 410. Since an insulation cover assembly 400 described in FIGS. 9 and 10 may correspond to the insulation cover assembly 400 described above in FIGS. 1 to 8, overlapping descriptions thereof may be omitted.

A short-circuit prevention member 420 may be supported by a cover frame 410, and may be fixed in a position to oppose a busbar (e.g., busbar 210 in FIGS. 7 and 8). An adhesive member disposed between the short-circuit prevention member 420 and the cover frame 410 may adhere the short-circuit prevention member 420 and the cover frame 410 to each other. For example, the adhesive member may include a double-sided tape or a binder material, but is not limited thereto.

Alternatively, the cover frame 410 may include a support protrusion 430 extending in the Z direction for supporting the short-circuit prevention member 420. Referring to FIG. 9, a support protrusion 430 may pass through the short-circuit prevention member 420 to support the short-circuit prevention member 420. End portions of support protrusions 430 may be heat sealed, such that the short-circuit prevention member 420 is firmly fixed in place such that the short-circuit prevention member 420 can not to be separated from cover frame 410. For example, the support protrusion 430 may be configured to penetrate from one surface (a first surface) of the short-circuit prevention member 420 to the other surface thereof (a second surface on the opposite side), and an end portion thereof may be heat-sealed to be in close contact with the other surface of the short-circuit prevention member 420. When the short-circuit prevention member 420 is fixed through the support protrusion 430, an adhesive member may be omitted.

The support protrusion 430 may be configured to support an edge of the short-circuit prevention member 420 without penetrating the short-circuit prevention member 420. For example, as illustrated in FIG. 10, a support protrusion 430 may be disposed on upper and lower edges of a short-circuit prevention member 420 to support an outer periphery of the short-circuit prevention member 420. Even in this case, end portions of support protrusions 430 may be heat sealed to prevent the short-circuit prevention member 420 from being separated from a cover frame 410.

A battery module 10 may include an insulation cover assembly 400 disposed between a busbar 210 and a housing 500, to prevent occurrence of an electrical short circuit between the busbar 210 and the housing 500 under a thermal runaway condition.

In addition, the insulation cover assembly 400 may include a short-circuit prevention member 420 that does not melt or collapse even when exposed to a high-temperature gas or a flame, to effectively prevent occurrence of an electrical short circuit between the busbar 210 and the housing 500.

In addition, given the position of the short-circuit prevention member 420 in the battery module 10, it is possible to suppress scattering of conductive particles between the busbar 210 and the housing 500 under a thermal runaway condition, to effectively prevent thermal runaway of the battery module 10.

In addition, in one embodiment, the insulation cover assembly 400 can improve thermal and structural stability of the insulation cover assembly 400 under a thermal runaway condition, and may improve insulation performance, by the short-circuit prevention member 420.

Although various embodiments of this patent document have been described in detail above, modifications are readily apparent to those skilled in the art. In addition, the disclosed technology may be implemented by deleting some components from the above-described embodiments, and each embodiment may be implemented in combination with each other.

A battery module according to the disclosed embodiments may prevent occurrence of an electrical short circuit between a busbar and a housing under a thermal runaway condition.

In addition, the battery module may include an insulation cover assembly having resistance to a high-temperature gas or a flame, to improve structural stability under a thermal runaway condition.

In addition, with the disclosed technology, it is possible to prevent conductive particles from being stacked between a busbar and a housing under a thermal runaway condition, to prevent an electrical short circuit between a battery cell and the housing or between the busbar and the housing.

What is claimed is:

1. A battery module comprising:
   a housing having an internal space;
   a cell stack accommodated in the internal space and including a plurality of battery cells;
   a busbar assembly including a busbar electrically connecting the plurality of battery cells to each other and a busbar frame supporting the busbar, disposed between the cell stack and the housing in a first direction; and
   an insulation cover assembly disposed between the busbar assembly and the housing in the first direction to prevent short circuit between the busbar and the housing,
   wherein the insulation cover assembly includes:
   a cover frame disposed between the busbar and the housing in the first direction; and
   a short-circuit prevention member coupled to the cover frame and spaced apart from the busbar in the first direction,
   wherein the busbar is disposed between the cover frame and the busbar frame,
   wherein the cover frame has an area, extending in a direction perpendicular to the first direction, which is larger than the busbar and is disposed to overlap the busbar in the first direction.

2. The battery module of claim 1, wherein the short-circuit prevention member comprises a material having a higher melting point than the cover frame.

3. The battery module of claim 1, wherein the short-circuit prevention member comprises ceramic wool.

4. The battery module of claim 1, wherein the short-circuit prevention member comprises a material having a thermal conductivity of less than 1.0 W/mK, and
   wherein, in thermogravimetric analysis (TGA), a residual amount of the material at 800° C. is 60 weight % or more.

5. The battery module of claim 1, wherein the short-circuit prevention member comprises a material incombustible at a temperature up to 800° C.

6. The battery module of claim 1, wherein the plurality of battery cells are stacked in a second direction perpendicular to the first direction, and
   the busbar opposes at least a portion of the cell stack in the first direction.

7. The battery module of claim 6, wherein the short-circuit prevention member is disposed between the busbar and the housing.

8. The battery module of claim 7, wherein a first surface of the short-circuit prevention member opposes the busbar, and
   a second surface of the short-circuit prevention member, opposite to the first surface, opposes the cover frame.

9. The battery module of claim 8, wherein the short-circuit prevention member is spaced apart from the busbar in the second direction.

10. The battery module of claim 7, wherein a first surface of the short-circuit prevention member opposes the cover frame, and
    a second surface of the short-circuit prevention member, opposite to the first surface, opposes the housing.

11. The battery module of claim 6, further comprising:
    a first heat blocking member disposed between the plurality of battery cells; and
    a second heat blocking member disposed between the cell stack and the housing.

12. The battery module of claim 11, wherein the second heat blocking member opposes the cell stack in a third direction,
    wherein the third direction is perpendicular to the first direction and the second direction.

13. The battery module of claim 6, further comprising an end cover coupled to at least one side of the housing and facing the cell stack in the first direction.

14. The battery module of claim 1, wherein the cover frame comprises a support protrusion protruding toward the short-circuit prevention member to support the short-circuit prevention member.

15. The battery module of claim 14, wherein the support protrusion is inserted into the short-circuit prevention member and an end of the support protrusion is heat-sealed.

16. The battery module of claim 14, wherein the support protrusion passes through the short-circuit prevention member.

17. The battery module of claim 1, further comprising an adhesive member fixing the short-circuit prevention member and the cover frame to each other.

18. An electric vehicle including the battery module of claim 1.

19. A hybrid electric vehicle including the battery module of claim 1.

20. An energy storage system including the battery module of claim 1.

* * * * *